Sept. 22, 1925.
R. WALKER
WINDSHIELD GUARD
Filed May 29, 1924
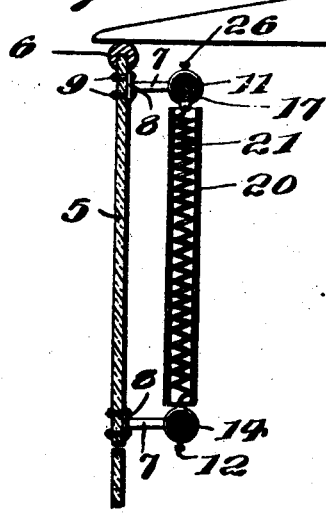
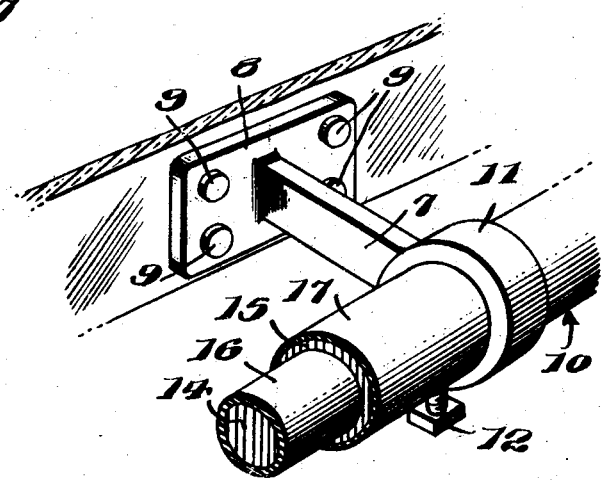
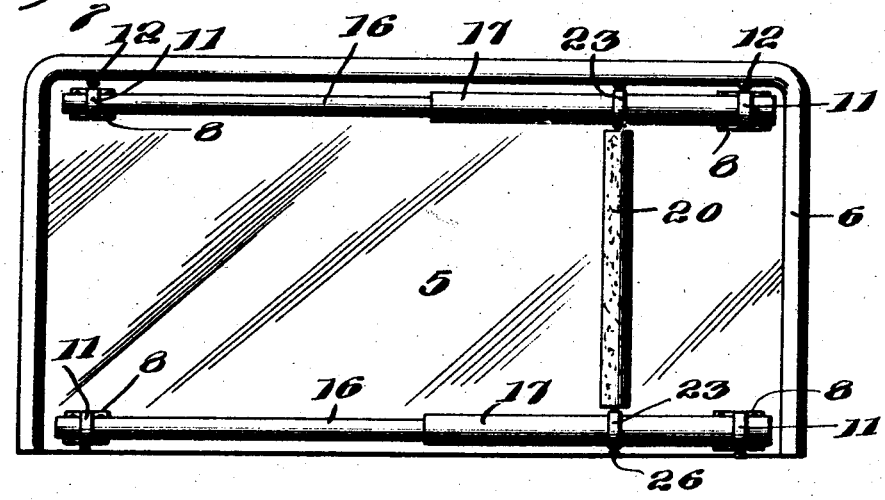
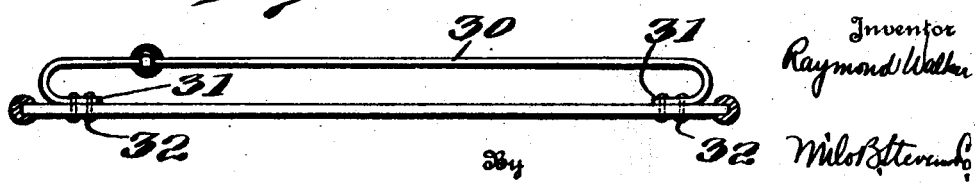
Inventor
Raymond Walker
By Milo B. Stevens
Attorney.

Patented Sept. 22, 1925.

1,554,474

UNITED STATES PATENT OFFICE.

RAYMOND WALKER, OF CHICAGO, ILLINOIS.

WINDSHIELD GUARD.

Application filed May 29, 1924. Serial No. 716,751.

*To all whom it may concern:*

Be it known that I, RAYMOND WALKER, a citizen of the United States, residing at Chicago, in the county of Cook and State of Illinois, have invented new and useful Improvements in Windshield Guards, of which the following is a specification.

This invention relates to windshield guards especially adapted for use on automobiles.

An important object of this invention is to provide a windshield guard especially adapted for use in preventing an occupant of the vehicle from being thrown through the windshield should the vehicle be suddenly and unexpectedly halted.

A further object of the invention is to provide a windshield guard and vehicle occupant protector which is of highly simplified construction, simple to apply, and cheap to manufacture.

Other objects and advantages will be apparent during the course of the following description.

In the accompanying drawing forming a part of this application and in which like numerals are employed to designate like parts throughout the same, Figure 1 is a vertical transverse sectional view through the protector applied;

Fig. 2 is an elevation of the same applied;

Fig. 3 is a sectional perspective illustrating the improved protector, and

Fig. 4 is a plan view illustrating a slight modification of the invention.

In the drawing, wherein for the purpose of illustration is shown a preferred embodiment of the invention, the numeral 5 designates one of the sections of or the entire windshield, the edges of which are provided with a metallic rim 6.

The invention forming the subject matter of this application resides in providing simple and reliable means to prevent the occupant of the vehicle from being thrown through the windshield should the vehicle be stopped suddenly and to this end I provide pairs of brackets 7 having attaching plates 8 secured in any suitable manner to the windshield and preferably by fastening devices 9. The attaching bases or portions 8 of the brackets 7 may if desired and practical be secured to the rim of the windshield.

The upper and lower brackets support horizontally disposed extensible rods 10 movable through rings or supporting members 11 at the outer ends of the brackets. Set screws or other fastening devices 12 may be employed to secure the extensible rods in position.

Fig. 3 illustrates that each extensible rod includes inner and outer interfitting sections 14 and 15 having rubber coverings 16 and 17, respectively.

By providing the rubber coverings 16 and 17 for the inner and outer members 14 and 15, respectively, noise and rattle is reduced to a minimum and a yieldable contact member is provided. If possible the occupant may grip the rubber covered inner and outer members 14 and 15 and thereby save himself from being thrown through the windshield.

However, the major protecting member is in the nature of a tubular rubber body 20 arranged vertically and receiving a coil spring 21, the ends of which are formed with attaching rings 23 adjustable on the outer members 15 of the extensible rods. The attaching rings 23 may be arranged at any point and secured in position by means of set screws 26 or other suitable fastening devices. The tubular member 20 is preferably about as stout or a little stouter than an ordinary water hose and consequently provides a secure though yieldable means for limiting the forward movement of the occupant of the vehicle should the vehicle be brought to a sudden halt. It will be seen that the invention forming the subject matter of this application adds greatly to the safety of riding in an automobile. The person riding in the front of the vehicle immediately in back of the windshield is especially protected. It will be seen that the coil spring 21 may be adjusted as to length so that the invention may be applied to windshields of various sizes and furthermore the extensible rods 10 provide a convenient means whereby the invention may be applied to windshields of different lengths.

In the modified form of the invention illustrated in Fig. 4 one of the horizontal rods is designated by the numeral 30 and has its ends formed with return bends to define attaching portions 31 which may be secured to any convenient portion of the windshield by fastening devices 32. The return bends at the end portions of the rods 30 space the rods from the windshield and consequently space the vertical yielding member from the windshield so that the vertical member may yield a considerable extent before contacting with the windshield.

Summarizing it will be seen that the horizontal members 10 and the vertical member 20 co-operate in protecting the occupant of the vehicle from coming in destructive contact with the windshield should the vehicle come to a sudden halt for any reason.

A protector constructed in accordance with this invention does not in any way interfere with the adjustment of the windshield or the clear vision of the operator.

If desired a glare shield or the like may be attached to one of the horizontal extensible members 10.

Having thus described the invention, what is claimed is:

A protector for motor vehicles comprising pairs of upper and lower brackets having means whereby the same may be secured to the upper and lower portions of a windshield, extensible rods secured to said brackets and consisting of inner and outer telescopic rubber covered sections, means carried by said rods to secure the same in position, a coil spring arranged vertically between said upper and lower rods and having its ends provided with rings adjustably secured to said rods, a flexible tubing receiving said coil spring and arranged between the rods, the rubber covering on the sections of said upper and lower rods forming a means to reduce rattle, and to provide a yieldable contact means and also a secure gripping means.

In testimony whereof I affix my signature.

RAYMOND WALKER.